United States Patent Office 3,522,274
Patented July 28, 1970

3,522,274
2,3-DIHYDRO-1-ALKYL-7-SULFAMOYL-
4,1-BENZOXAZEPIN-5(1H)-ONES
Arthur A. Santilli, Havertown, Pa., and Thomas S. Osdene, Richmond, Va., assignors to American Home Products Corporation, New York, N.Y., a corporation of Delaware
No Drawing. Filed May 24, 1967, Ser. No. 640,848
Int. Cl. C07d 87/54
U.S. Cl. 260—333          9 Claims

ABSTRACT OF THE DISCLOSURE

The compounds of the class of 2,3-dihydro-1-alkyl-7-sulfamoyl-4,1-benzoxazepin-5(1H)-ones useful as analgesic, diuretic and central nervous system depressant agents.

BACKGROUND OF THE INVENTION

This invention relates to the field of new physiologically active 2,3 - dihydro-1-alkyl-7-sulfamoyl-4,1-benzoxazepin 5(1H) - ones; 2,3-dihydro-1-alkyl-7-alkyl-sulfamoyl-4,1-benzoxazepin 5(1H)-ones; novel processes for their preparation and new intermediates useful in the preparation thereof.

In U.S. Pat. No. 3,217,001 there is disclosed 1H-2,1,3-benzothiadiazin-4(3H)-one 2-oxide derivatives which are useful as psycholeptic agents, analgesics and central nervous system depressants.

E. Uhlig et al., Chem. Ber. 98, 983 (1965) describes the preparation of 2,3-dihydro-1-methyl-4,1-benzoxazepin-5(1H)-one.

SUMMARY OF THE INVENTION

More particularly, this invention is directed to compounds of the formula:

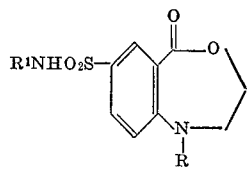

wherein R is an alkyl group of less than eight carbon atoms, and R¹ is selected from the group consisting of hydrogen and alkyl of less than eight carbon atoms.

The final products of this invention are physiologically active substances which are useful as analgesic, diuretic and central nervous system depressant agents.

The compounds of the present invention can be prepared and administered to warm-blooded animals in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is sub-divided in unit doses containing appropriate quantities of the compound, the unit dosage form can be a packaged preparation, the package containing discrete quantities of preparation, for example, packaged powders of vials or ampules.

The unit dosage form can be a capsule, cachet or tablet itself or it can be the appropriate number of any of those in packaged form. The quantity of compounds in a unit dose of preparation may be varied or adjusted from 1 mg. to 100 mg. according to the particular application and the potency of the active ingredient.

In therapeutic use, the preparations are administered at the initial dosage of about 5 mg. to 25 mg. per kilogram daily. The dosages, however, may be varied depending upon the requirements of the patient.

DESCRIPTION OF THE PREFERRED EMBODIMENTS

The compounds of this invention may be prepared in accordance with the following reaction scheme wherein R and R¹ are as hereinbefore defined:

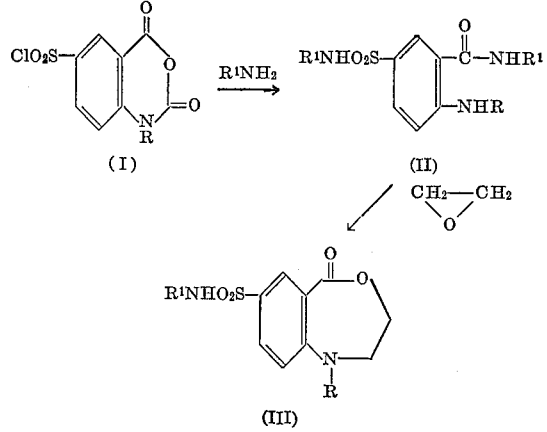

In accordance with a feature of this invention 5-chlorosulfonyl-N-alkyl-isatoic anhydrides of Formula I are reacted with alkylamines to yield the sulfamoylbenzamides of Formula II.

The initial compounds of Formula I may be prepared by any conventional method such as described in U.S. Pat. No. 3,217,001.

The sulfamoylbenzamides (II) are then treated with ethylene oxide in acetic acid to yield the 2,3-dihydro-1-alkyl-7-sulfamoyl-4,1 - benzoxazepin - 5(1H) - ones (III), which are the final products of this invention.

Alternatively, final products of this invention may be prepared by first reacting 1,2,3,4-tetrahydro-1-methyl-5H-1,4-benzodiazepin-5-one with chlorosulfonic acid to yield 1,2,3,5 - tetrahydro - 1 - methyl-5-oxo-4,1-benzoxazepin-7-sulfonyl chloride. The 1,2,3,5-tetrahydro-1-methyl-5-oxo-4,1-benzoxazepin-7-sulfonyl chloride is then reacted with alkylamine of the formula: R¹NH₂, to yield the 2,3-dihydro-1-methyl-7-sulfamoyl-4,1 - benzoxazepin - 5(1H)-ones of the formula:

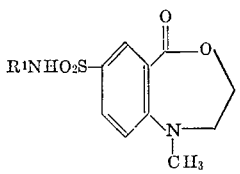

(IV)

wherein $R^1$ is as hereinbefore defined.

1,2,3,4-tetrahydro-1-methyl-5H - 1,4 - benzodiazapin-5-one may be prepared according to the procedure described by E. Uhlig et al., Chem. Ber., 98, p. 983.

The following examples illustrate the invention (all temperatures being in centigrade):

Example 1.—2-(methylamino)-5-(sulfamoyl)benzamide 5.0 g. of 5-chlorosulfonyl-N-methylisatoic anhydride is added portionwise to 35 ml. of concentrated ammonium hydroxide. The reaction mixture is heated for 15 min. on a steam-bath. On cooling the reaction mixture a crystalline product is deposited out of solution. This material amounts to 2.6 g.; M.P. 203–214°. Recrystallization from aqueous N,N-dimethylformamide affords 1.7 g. of 2-(methylamino)-5-(sulfamoyl)benzamide, M.P. 223–224°.

*Analysis.*—Calcd. for (percent): C, 53.65; H, 7.40; N, N, 18.33; S, 13.98. Found (percent): C, 41.99; H, 4.56; N, 18.45; S, 13.4.

Example 2.—2-methylamino-N-propyl-5-(propylsulfamoyl)benzamide 19.3 g. of 5-chlorosulfonyl-N-methylisatoic anhydride is added portionwise to 50 ml. of n-propylamine. The reaction mixture is heated on a steam-bath for a few minutes. A sufficient amount of water is added to precipitate the product. The product amounted to 19.3 g.; M.P. 90–95°. Recrystallization from ethanol affords 12 g. of 2-methylamino-N-propyl - 5 - (propylsulfamoyl)benzamide, M.P. 141–143°.

*Analysis.*—Calcd. for (percent): C, 53.65; H, 7.40; N, 13.41; S, 10.23. Found (percent): C, 53.57; H, 7.35; N, 13.28; S, 9.8.

Example 3.—2-methylamino-N-methyl-5-(methylsulfamoyl)benzamide

Following the procedure for Example 2, but substituting methylamine for n-propylamine there is obtained 2-methylamino-N-methyl-5-(methylsulfamoyl)benzamide.

Example 4.—2-methylamino-N-ethyl-5-(ethylsulfamoyl)benzamide

Following the procedure of Example 2, but substituting ethylamine for n-propylamine there is obtained 2-methylamino-N-ethyl-5-(ethylsulfamoyl)benzamide.

Example 5.—2-methylamino-N-butyl-5-(butylsulfamoyl)benzamide

Following the procedure of Example 2, but substituting butylamine for n-propylamine there is obtained 2-methylamino-N-butyl-5-(butylsulfamoyl)benzamide.

Example 6.—2-methylamino-N-pentyl-5-(pentylsulfamoyl)benzamide

Following the procedure of Example 2, but substituting pentylamine for n-propylamine there is obtained 2-methylamino-N-pentyl-5-(pentylsulfamoyl)benzamide.

Example 7.—2-methylamino-N-hexyl-5-(hexylsulfamoyl)benzamide

Following the procedure of Example 2, but substituting hexylamine for n-propylamine there is obtained 2-methylamino-N-hexyl-5-(hexylsulfamoyl)benzamide.

Example 8.—2-methylamino-N-heptyl-5-(heptylsulfamoyl)benzamide

Following the procedure of Example 2, but substituting heptylamine for n-propylamine there is obtained 2-methylamino-N-heptyl-5-(heptylsulfamoyl)benzamide.

Example 9.—2-ethylamino-N-propyl-5-(propylsulfamoyl)benzamide

Following the procedure of Example 2, but substituting 5-chlorosulfonyl-N-ethylisatoic anhydride for 5-chlorosulfonyl-N-methylisatoic anhydride there is obtained 2-ethylamino-N-propyl-5-(propylsulfamoyl)benzamide.

Example 10.—2-propylamino-N-propyl-5-(propylsulfamoyl)benzamide

Following the procedure of Example 2, but substituting 5-chlorosulfonyl-N-propylisatoic anhydride for 5-chlorosulfonyl-N-methylisatoic anhydride there is obtained 2-propylamino-N-propyl-5-(propylsulfamoyl)benzamide.

Example 11.—2-butylamino-N-propyl-5-(propylsulfamoyl)benzamide

Following the procedure of Example 2, but substituting 5-chlorosulfonyl-N-butylisatoic anhydride for 5-chlorosulfonyl-N-methylisatoic anhydride there is obtained 2-butylamino-N-propyl-5-(propylsulfamoyl)benzamide.

Example 12.—2-pentylamino-N-propyl-5-(propylsulfamoyl)benzamide

Following the procedure of Example 2, but substituting 5-chlorosulfonyl-N-pentylisatoic anhydride for 5-chlorosulfonyl-N-methylisatoic anhydride there is obtained 2-pentylamino-N-propyl-5-(propylsulfamoyl)benzamide.

Example 13.—2-heptylamino-N-propyl-5-(propylsulfamoyl)benzamide

Following the procedure of Example 2, but substituting 5-chlorosulfonyl-N-heptylisatoic anhydride for 5-chlorosulfonyl-N-methylisatoic anhydride there is obtained 2-heptylamino-N-propyl-5-(propylsulfamoyl)benzamide.

Example 14.—2-hexylamino-N-propyl-5-(propylsulfamoyl)benzamide

Following the procedure of Example 2, but substituting 5-chlorosulfonyl-N-hexylisatoic anhydride for 5-chlorosulfonyl-N-methylisatoic anhydride there is obtained 2-hexylamino-N-propyl-5-(propylsulfamoyl)benzamide.

Example 15.—2,3-dihydro-1-methyl-7-sulfamoyl-4,1-benzoxazepin-5(1H)-one

A solution of 17.2 g. of 2-methylamino-5-sulfamoylbenzamide in 150 ml. of glacial acetic acid containing 22.5 ml. of ethylene oxide is heated on a steam-bath in a pressure flask for 70 hrs. The reaction mixture is filtered and the filtrate is concentrated to half its volume in vacuo on a rotary evaporator. The reaction mixture is filtered. The solid filter cake amounts to 10 g.; M.P. 154–168°. Recrystallization from ethanol affords 5.0 g. of 2,3-dihydro-1-methyl-7-sulfamoyl - 4,1 - benzoxazepin-5(1H)-one, M.P. 195–196°.

*Analysis.*—Calcd. for (percent): C, 46.87; H, 4.72; N, 10.93; S, 12.51. Found (percent): C, 46.72; H, 4.46; N, 11.26; S, 12.2.

Example 16.—2,3-dihydro-1-methyl-7-ethylsulfamoyl-4,1-benzoxazepin-5(1H)-one

A solution of 1.9 g. of 2-methylamino-N-ethyl-5-(ethylsulfamoyl)benzamide in 15 ml. of glacial acetic acid containing 5 ml. of ethylene oxide is heated on a steam-bath in a pressure flask for 17 hrs. The reaction mixture is poured into 50 ml. of water and neutralized with 10% sodium bicarbonate solution. The precipitate which is deposited amounts to 0.5 g.; M.P. 168–171°. Recrystallization from ethanol raises 2,3-dihydro-1-methyl-7-ethylsulfamoyl-4,1-benzoxazepin-5(1H)-one, M.P. to 178–181°.

Analysis.—Calcd. for (percent): C, 50.70; H, 5.67; N, 9.86; S, 11.28. Found (percent): C, 50.92; H, 5.56; N, 9.91; S, 11.1.

Similarly, by substituting another 2-alkyl-N-ethyl-5-(ethylsulfamoyl)benzamide for 2-methylamino-N-ethyl-5-(ethylsulfamoyl)benzamide there is obtained the corresponding 2,3-dihydro-1-alkyl-7-ethylsulfamoyl-4,1-benzoxazepin-5(1H)-one.

Example 17.—2,3-dihydro-1-methyl-7-propylsulfamoyl-4,1-benzoxazepin-5(1H)-one

A solution of 18.8 g. of 2-methylamino-N-propyl-5-(propylsulfamoyl)benzamide in 100 ml. of glacial acetic acid containing 18.2 ml. of ethylene oxide is heated in a pressure flask for 17 hrs. on a steam-bath. The reaction mixture is evaporated to dryness in a rotary evaporator in vacuo leaving an oil. The oil is treated with 25 ml. of 10% sodium bicarbonate solution, then dissolved in 50 ml. of chloroform. On evaporation of the chloroform an oil residue remains which crystallizes. The product amounts to 2.9 g. Recrystallization from ethanol gives 2,3-dihydro-1-methyl-7-propylsulfamoyl-4,1-benzoxazepin-5(1H)-one with M.P. 150.5–152.5°.

Analysis.—Calcd. for (percent): C, 52.33; H, 6.08; N, 9.39; S, 10.75. Found (percent): C, 52.52; H, 6.19; N, 9.43; S, 10.7.

Example 18.—2,3-dihydro-1-methyl-7-methylsulfamoyl-4,1-benzoxazepin-5(1H)-one

Following the procedure of Example 17, but substituting 2-methylamino-N-methyl-5-(methylsulfamoyl)benzamide for 2-methylamino-N-propyl-5-(propylsulfamoyl)benzamide there is obtained 2,3-dihydro-1-methyl-7-methylsulfamoyl-4,1-benzoxazepin-5(1H)-one Example 19.—2,3-dihydro-1-methyl-7-butylsulfamoyl-4,1-benzoxazepin-5(1H)-one Following the procedure of Example 17, but substituting 2-methylamino-N-butyl-5-(butylsulfamoyl)benzamide for 2-methylamino-N-propyl-5-(propylsulfamoyl)benzamide there is obtained 2,3-dihydro-1-methyl-7-butylsulfamoyl-4,1-benzoxazepin-5(1H)-one.

Example 20.—2,3-dihydro-1-methyl-7-pentylsulfamoyl-4,1-benzoxazepin-5(1H)-one

Following the procedure of Example 17, but substituting 2-methylamino-N-pentyl-5-(pentylsulfamoyl)benzamide for 2-methylamino-N-propyl-5-(propylsulfamoyl)benzamide there is obtained 2,3-dihydro-1-methyl-7-pentylsulfamoyl-4,1-benzoxazepin-5(1H)-one.

Example 21.—2,3-dihydro-1-methyl-7-hexylsulfamoyl-4,1-benzoxazepin-5(1H)-one

Following the procedure of Example 17, but substituting 2-methylamino-N-hexyl-5-(hexylsulfamoyl)benzamide for 2-methylamino-N-propyl-5-(propylsulfamoyl)benzamide there is obtained 2,3-dihydro-1-methyl-7-hexylsulfamoyl-4,1-benzoxazepin-5(1H)-one.

Example 22.—2,3-dihydro-1-methyl-7-heptylsulfamoyl-4,1-benzoxazepin-5(1H)-one

Following the procedure of Example 17, but substituting 2-methylamino-N-heptyl-5-(heptylsulfamoyl)benzamide for 2-methylamino-N-propyl-5-(propylsulfamoyl)benzamide there is obtained 2,3-dihydro-1-methyl-7-heptylsulfamoyl-4,1-benzoxazepin-5(1H)-one.

Example 23.—2,3-dihydro-1-ethyl-7-propyl-4,1-benzoxazepin-5(1H)-one

Following the procedure of Example 17, but substituting 2-ethylamino-N-propyl-5-(propylsulfamoyl)benzamide for 2-methylamino-N-propyl-5-(propylsulfamoyl)benzamide there is obtained 2,3-dihydro-1-ethyl-7-propyl-4,1-benzoxazepin-5(1H)-one.

Example 24.—2,3-dihydro-1-propyl-7-propyl-4,1-benzoxazepin-5(1H)-one

Following the procedure of Example 17, but substituting 2-propylamino-N-propyl-5-(propylsulfamoyl)benzamide for 2-methylamino-N-propyl-5-(propylsulfamoyl)benzamide there is obtained 2,3-dihydro-1-propyl-7-propyl-4,1-benzoxazepin-5(1H)-one.

Example 25.—2,3-dihydro-1-butyl-7-propyl-4,1-benzoxazepin-5(1H)-one

Following the procedure of Example 17, but substituting 2-butylamino-N-propyl-5-(propylsulfamoyl)benzamide for 2-methylamino-N-propyl-5-(propylsulfamoyl)benzamide there is obtained 2,3-dihydro-1-butyl-7-propyl-4,1-benzoxazepin-5(1H)-one.

Example 26.—2,3-dihydro-1-pentyl-7-propyl-4,1-benzoxazepin-5(1H)-one

Following the procedure of Example 17, but substituting 2-pentylamino-N-propyl-5-(propylsulfamoyl)benzamide for 2-methylamino-N-propyl-5-(propylsulfamoyl)benzamide there is obtained 2,3-dihydro-1-pentyl-7-propyl-4,1-benzoxazepin-5(1H)-one.

Example 27.—2,3-dihydro-1-heptyl-7-propyl-4,1-benzoxazepin-5(1H)-one

Following the procedure of Example 17, but substituting 2-heptylamino-N-propyl-5-(propylsulfamoyl)benzamide for 2-methylamino-N-propyl-5-(propylsulfamoyl)benzamide there is obtained 2,3-dihydro-1-heptyl-7-propyl-4,1-benzoxazepin-5(1H)-one.

Example 28.—2,3-dihydro-1-hexyl-7-propyl-4,1-benzoxazepin-5(1H)-one

Following the procedure of Example 17, but substituting 2-hexylamino-N-propyl-5(propylsulfamoyl)benzamide for 2-methylamino-N-propyl-5-(propylsulfamoyl)benzamide there is obtained 2,3-dihydro-1-hexyl-7-propyl-4,1-benzoxazepin-5(1H)-one.

Example 29.—2,3-dihydro-1-methyl-7-sulfamoyl-4,1-benzoxazepin-5(1H)-one (A) Preparation of 1,2,3,5-tetrahydro-1-methyl-5-oxo-4,1-benzoxazepin-7-sulfonyl chloride.—3.5 g. of 1,2,3,4-tetrahydro-1-methyl-5H-1,4-benzodiazepin-5-one is added portionwise to 25 ml. of chlorosulfonic acid. The reaction mixture is heated on a steam-bath for 30 min., cooled and enough ice is cautiously added to decompose the excess chlorosulfonic acid. The precipitate which is deposited amounts to 2.3 g., M.P. 143–150°. Recrystallization from benzene petroleum ether (B.P. 30–60°) gives the 1,2,3,5-tetrahydro-1-methyl-5-oxo-4,1-benzoxazepin-7-sulfonyl chloride, M.P. 145–146°.

(B) Preparation of 2,3-dihydro-1-methyl-7-sulfamoyl-4,1-benzoxazepin-5(1H)-one.—20 ml. of concentrated ammonium hydroxide is added to the product of part (A) and the mixture is heated on a steam-bath for 15 min. On cooling crystals precipitate. The mixture was filtered to yield 2,3-dihydro-1-methyl-7-sulfamoyl-4,1-benzoxazepin-5(1H)-one, M.P. 195–196°.

Analysis.—Calcd. for (percent): C, 43.56; H, 3,66; N, 5.08; S, 11.63; Cl, 12.83. Found (percent): C, 43.72; H, 3.48; N, 5.26; S, 12.1; Cl, 12.7.

The invention may be variously otherwise embodied within the scope of the appended claims.

What is claimed is:
1. A compound of the formula

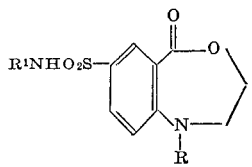

wherein R is an alkyl group of less than eight carbon atoms, and $R^1$ is selected from the group consisting of hydrogen and alkyl of less than eight carbon atoms.

2. A compound according to claim 1 that is 2,3-dihydro-1-methyl - 7 - ethylsulfamoyl - 4,1 - benzoxazepin-5(1H)-one.

3. A compound according to claim 1 that is 2,3-dihydro-1-methyl - 7 - propylsulfamoyl - 4,1 - benzoxazepin-5(1H)-one.

4. A compound according to claim 1 that is 2,3-dihydro-1-methyl - 7 - butylsulfamoyl - 4,1 - benzoxazepin-5(1H)-one.

5. A compound according to claim 1 that is 2,3-dihydro-1-methyl - 7 - sulfamoyl-4,1-benzoxazepin-5(1H)-one.

6. A compound according to claim 1 that is 2,3-dihydro-1-ethyl - 7 - ethylsulfamoyl - 4,1 - benzoxazepin-5(1H)-one.

7. A compound according to claim 1 that is 2,3-dihydro-1-ethyl - 7 - propylsulfamoyl - 4,1 - benzoxazepin-5(1H)-one.

8. A compound according to claim 1 that is 2,3-dihydro-1-ethyl - 7 - butylsulfamoyl - 4,1 - benzoxazepin-5(1H)-one.

9. A process for preparing the compound of claim 1 which comprises reacting a compound of the formula

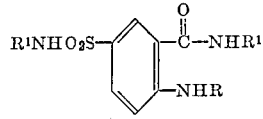

wherein R and $R^1$ are as hereinbefore defined, with ethylene oxide in acetic acid.

References Cited

FOREIGN PATENTS 630,571 10/1963 Belgium.

OTHER REFERENCES

E. Uhlig et al.: Chem. Berichte, vol. 98, pp. 983–988 (1965).

NORMA S. MILESTONE, Primary Examiner

U.S. Cl. X.R.

260—397.7